(12) United States Patent
Sato et al.

(10) Patent No.: US 11,975,829 B2
(45) Date of Patent: May 7, 2024

(54) MOTOR UNIT AND AIRCRAFT

(71) Applicant: Panasonic Intellectual Property Management Co., Ltd., Osaka (JP)

(72) Inventors: Daisuke Sato, Osaka (JP); Osamu Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 17/627,138

(22) PCT Filed: May 28, 2020

(86) PCT No.: PCT/JP2020/021203
§ 371 (c)(1),
(2) Date: Jan. 14, 2022

(87) PCT Pub. No.: WO2021/014755
PCT Pub. Date: Jan. 28, 2021

(65) Prior Publication Data
US 2022/0274693 A1    Sep. 1, 2022

(30) Foreign Application Priority Data

Jul. 23, 2019  (JP) .................................. 2019-135639
Apr. 15, 2020  (JP) .................................. 2020-073134

(51) Int. Cl.
*B64C 27/72*    (2006.01)
*B64D 27/24*    (2006.01)
(Continued)

(52) U.S. Cl.
CPC .............. *B64C 27/72* (2013.01); *B64D 27/24* (2013.01); *H02K 7/085* (2013.01); *H02K 21/22* (2013.01)

(58) Field of Classification Search
CPC ....... B64C 27/59; B64C 27/605; B64C 27/14; B64C 27/72; B64C 27/24; H02K 21/22; H02K 7/085
See application file for complete search history.

(56) References Cited

U.S. PATENT DOCUMENTS 11,597,506 B2 *   3/2023  Clarke .................... B64C 27/72
2019/0118941 A1 * 4/2019  Iskrev .................... B64C 11/44
(Continued)

FOREIGN PATENT DOCUMENTS

CN       204383742 U    6/2015
JP         6006452 B1   10/2016
(Continued)

OTHER PUBLICATIONS

English Translation of Chinese Search Report dated Aug. 14, 2023 for the related Chinese Patent Application No. 202080052183.5.
(Continued)

*Primary Examiner* — Tye William Abell
(74) *Attorney, Agent, or Firm* — Rimon P.C.

(57) ABSTRACT

A motor unit includes a motor and a pitch angle changing mechanism. The motor generates power for rotating a blade. The pitch angle changing mechanism changes a pitch angle of the blade. The motor includes a stator and a rotor. The rotor is located outside of the stator and the blade is coupled to the rotor. The pitch angle changing mechanism includes one displaceable displacement member. A part of the displacement member is located inside of the stator.

14 Claims, 14 Drawing Sheets

(51) Int. Cl.
    *H02K 7/08*    (2006.01)
    *H02K 21/22*   (2006.01)

(56) References Cited

U.S. PATENT DOCUMENTS

| 2019/0161179 A1* | 5/2019 | Uebori | B64U 10/14 |
| 2020/0130824 A1* | 4/2020 | Willinger | B64C 27/12 |

FOREIGN PATENT DOCUMENTS

| JP | 2017-185945 | 10/2017 |
| WO | 2018/045253 A1 | 3/2018 |

OTHER PUBLICATIONS

International Search Report of PCT application No. PCT/JP2020/021203 dated Jul. 14, 2020.
Extended European Search Report dated Jul. 15, 2022 for the related European Patent Application No. 20844308.5.

* cited by examiner

MOTOR UNIT AND AIRCRAFT

CROSS-REFERENCE TO RELATED APPLICATIONS

This application is a U.S. national stage application of the PCT International Application No. PCT/JP2020/021203 filed on May 28, 2020, which claims the benefit of foreign priority of Japanese patent application No. 2019-135639 filed on Jul. 23, 2019 and Japanese patent application No. 2020-073134 filed on Apr. 15, 2020, the contents all of which are incorporated herein by reference.

TECHNICAL FIELD

The present disclosure relates to a motor unit and an aircraft. Specifically, the present disclosure relates to a motor unit including a mechanism that changes a pitch angle of a blade, and an aircraft including the motor unit.

BACKGROUND ART

PTL 1 discloses a multicopter. A driver of the multicopter includes an electric motor and a rotor head unit. The rotor head unit includes a rotor head and a variable pitch mechanism. The rotor head supports a blade at an upper end of an output shaft protruding upward of the electric motor. The variable pitch mechanism changes a pitch angle of the blade. The variable pitch mechanism includes a pitch plate, a pitch plate boss, a pitch lever, and a servomotor. The pitch plate and the pitch plate boss are attached to an outer periphery of the output shaft. A servo mount plate is attached to an upper surface of the electric motor. The pitch lever and the servomotor are attached on the servo mount plate.

CITATION LIST

Patent Literature

PTL 1: Unexamined Japanese Patent Publication No. 2017-185945

SUMMARY

In the driver of the multicopter described above, members constituting the variable pitch mechanism, which are the pitch plate, the pitch plate boss, the pitch lever, and the servomotor, are located above the electric motor. The blade is located further above the variable pitch mechanism. Therefore, the driver tends to be large in an axial direction of the output shaft of the electric motor.

The present disclosure has been made in view of the above circumstances. An object of the present disclosure is to provide a motor unit and an aircraft capable of suppressing an increase in size in an axial direction of a motor.

A motor unit according to one aspect of the present disclosure includes a motor that generates power for rotating a blade, and a pitch angle changing mechanism that changes a pitch angle of the blade. The motor includes a stator and a rotor that is located outside of the stator and to which the blade is coupled. The pitch angle changing mechanism includes one displaceable displacement member. A part of the displacement member is located inside of the stator.

Further, the pitch angle changing mechanism may perform cyclic pitch control.

The motor unit may have the following configuration. The pitch angle changing mechanism includes a rotating member and a support member. The rotating member is coupled to the blade, and rotates about an axis that serves as a rotation center of the rotor together with the blade. The support member has a support surface and supports the rotating member by the support surface. At least one of the rotating member or the support member is a displacement member.

The motor unit may have the following configuration. The pitch angle changing mechanism further includes a ball joint. The ball joint rotatably supports the support member. A part of the ball joint is located inside of the stator.

The motor unit may have the following configuration. The pitch angle changing mechanism includes a moving member as a displacement member. The moving member moves in a direction along an axis serving as a rotation center of the rotor.

The motor unit may have the following configuration. The motor unit further includes a shaft. The shaft is located inside of the stator and defines the rotation center of the rotor. A part of the moving member is located between the stator and the shaft.

The motor unit may have the following configuration. The motor further includes a bearing. The bearing rotatably supports the shaft. A part of the bearing is located inside of the stator.

The motor unit may have the following configuration. The moving member rotates about the axis together with the rotor. The pitch angle changing mechanism further includes a lever that moves the moving member in an axial direction. The lever is preferably a displacement member.

The motor unit may have the following configuration. The rotor includes an opposing portion. The opposing portion faces the stator in the axial direction. The pitch angle changing mechanism further includes at least one coupling member. The coupling member couples the moving member and the blade. The coupling member penetrates the opposing portion.

The pitch angle changing mechanism preferably includes a plurality of coupling members as one coupling member.

The motor unit preferably has the following configuration. The rotor includes a guide. The guide guides movement of the moving member in the axial direction.

The motor unit preferably has the following configuration. The pitch angle changing mechanism further includes a power source for the moving member. A part of the power source is located inside of the stator.

The motor unit preferably further includes a blade.

An aircraft according to one aspect of the present disclosure includes a motor unit and a body. The motor unit is attached to the body.

In the motor unit and the aircraft according to the above aspects, it is possible to suppress an increase in size in the axial direction of the motor.

DESCRIPTION OF PREFERRED EMBODIMENTS

Hereinafter, a motor unit and an aircraft including the motor unit will be described.

(1) First Exemplary Embodiment

Figure 1:
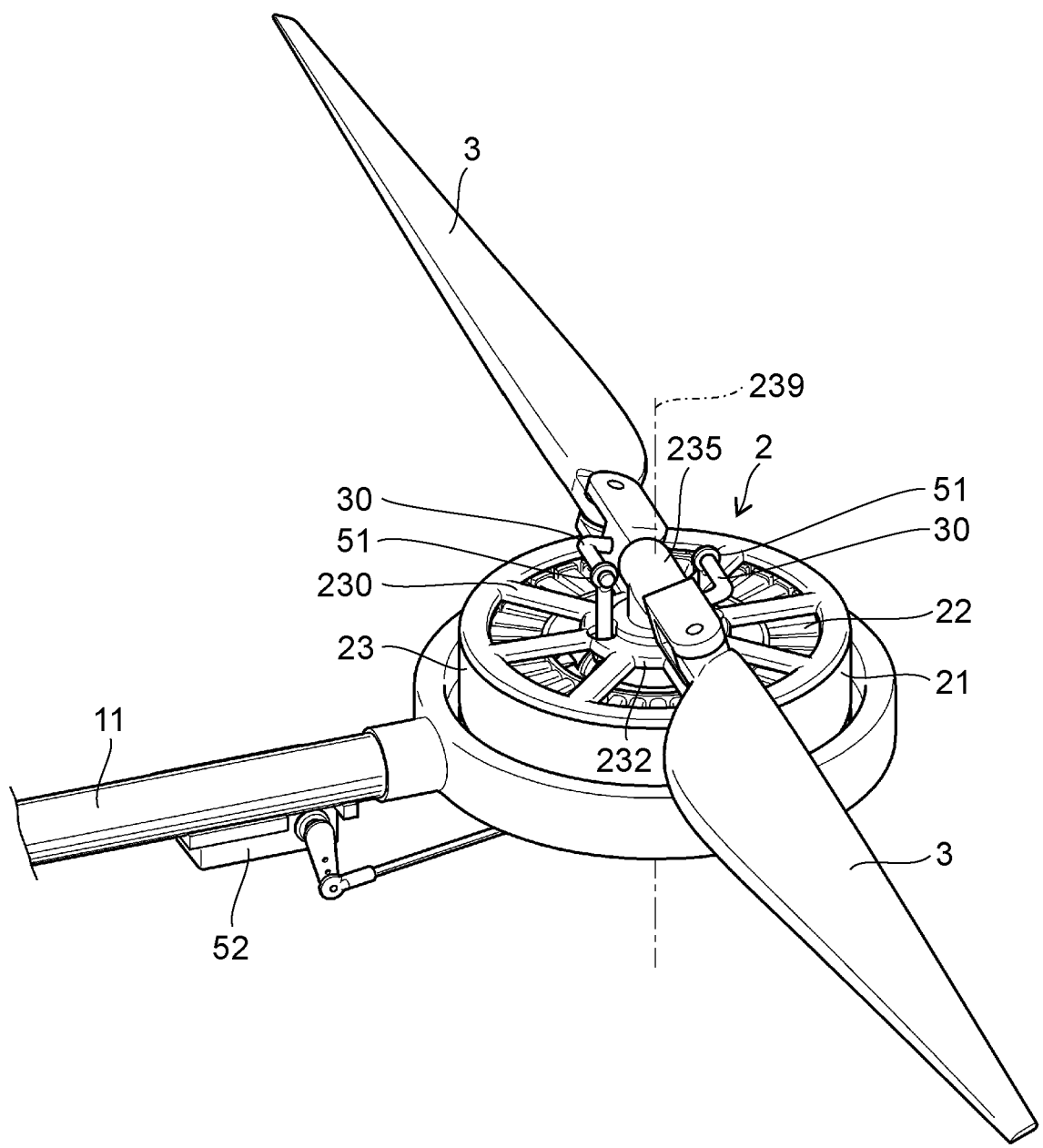
FIG. 1 is a perspective view of a motor unit according to a first exemplary embodiment.

First, a first exemplary embodiment will be described. FIG. 1 is a perspective view of motor unit 2 according to the first exemplary embodiment. Motor unit 2 illustrated in FIG. 1 includes motor 21. Hereinafter, motor 21 is referred to as first motor 21. First motor 21 is used as a power source for blade (propeller) 3, and generates power for rotating blade 3. Motor unit 2 further includes at least one blade 3. Blade 3 can rotate by the power generated by first motor 21.

Figure 2:
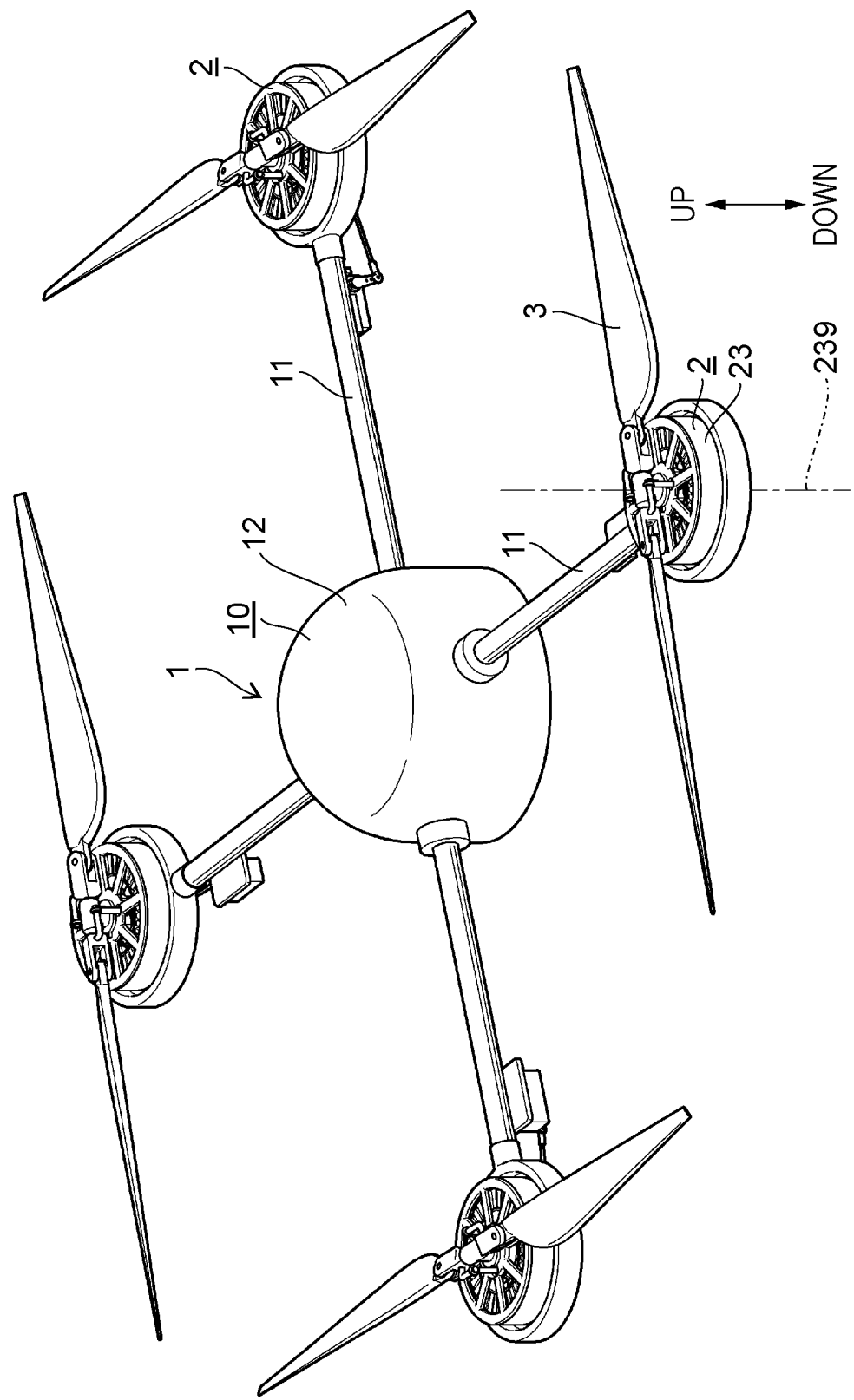
FIG. 2 is a perspective view of an aircraft including the motor unit.

FIG. 2 is a perspective view of aircraft 1 including motor unit 2 according to the first exemplary embodiment. Aircraft 1 is a rotorcraft having a plurality of motor units 2 used as rotary wings. Aircraft 1 is an unmanned aerial vehicle capable of autonomous flight or flight by remote control. Aircraft 1 is large and can be used for agrochemical spraying, transportation, and the like. Note that a size of aircraft 1 is not limited, and aircraft 1 may be small, for example.

Aircraft 1 includes body 10 and the plurality of motor units 2. That is, aircraft 1 is a multi-rotor (multicopter) including the plurality of motor units 2. Aircraft 1 includes four motor units 2. A number of motor units 2 included in aircraft 1 is not limited, and may be two, three, five, or more. Aircraft 1 may be a single rotor including only one motor unit 2.

Aircraft 1 further includes arms 11 as many as motor units 2. That is, aircraft 1 includes four arms 11. The plurality of arms 11 corresponds to the plurality of motor units 2 on a one-to-one basis. Each arm 11 has a rod shape. Each motor unit 2 is coupled to body 10 via corresponding arm 11.

Body 10 includes, for example, housing 12, a flight controller, and a power supply. The flight controller and the power supply are built in housing 12. Note that all or a part of the flight controller and the power supply may be attached to an outer surface of housing 12.

The flight controller includes, for example, a control unit and a plurality of sensors. The control unit is, for example, a microcontroller. The control unit includes a processor and a memory as hardware. The control unit controls the flight of aircraft 1 by causing the processor to execute a program recorded in the memory. The plurality of sensors can include an acceleration sensor, a gyro sensor, a geomagnetic sensor, an atmospheric pressure sensor (altimeter), a global positioning system (GPS) sensor, and an image sensor. The control unit controls each motor unit 2 (specifically, first motor 21 and motor 52 to be described later) on the basis of data acquired by the plurality of sensors, and controls a flight direction, a flight speed, a flight orientation, and the like of aircraft 1.

Each motor unit 2 is controlled by the flight controller, for example, via an electric speed controller (ESC). The ESC may be provided in body 10 or may be provided in each motor unit 2. The power supply supplies power to the flight controller and the plurality of motor units 2. The power supply is, for example, a battery such as a lithium polymer battery, a lithium ion battery, or a nickel hydrogen battery, or the like. Body 10 may further include a remote controller, a camera device, or the like. Body 10 may further include a communication device that communicates with an external device such as a personal computer.

During a flight of aircraft 1, axis 239 as a rotation center of rotor 23 included in each motor unit 2 is substantially parallel to a vertical direction. Blade 3 included in motor unit 2 is disposed on an upper side of rotor 23. In the present disclosure, a direction in which axis 239 serving as a rotation center of rotor 23 extends (a direction parallel to axis 239) is defined as up-down direction, a direction from rotor 23 toward blade 3 is defined as upward, and a direction from blade 3 toward rotor 23 is defined as downward. In the present disclosure, in motor unit 2, a direction from axis 239 serving as the rotation center of rotor 23 toward an outer peripheral surface of rotor 23 is defined as outside, and a direction from the outer peripheral surface of rotor 23 toward axis 239 as the rotation center of rotor 23 is defined as inside. In addition, the "axis" in the present disclosure is a virtual straight line that serves a rotation center of a rotating object.

Figure 3:
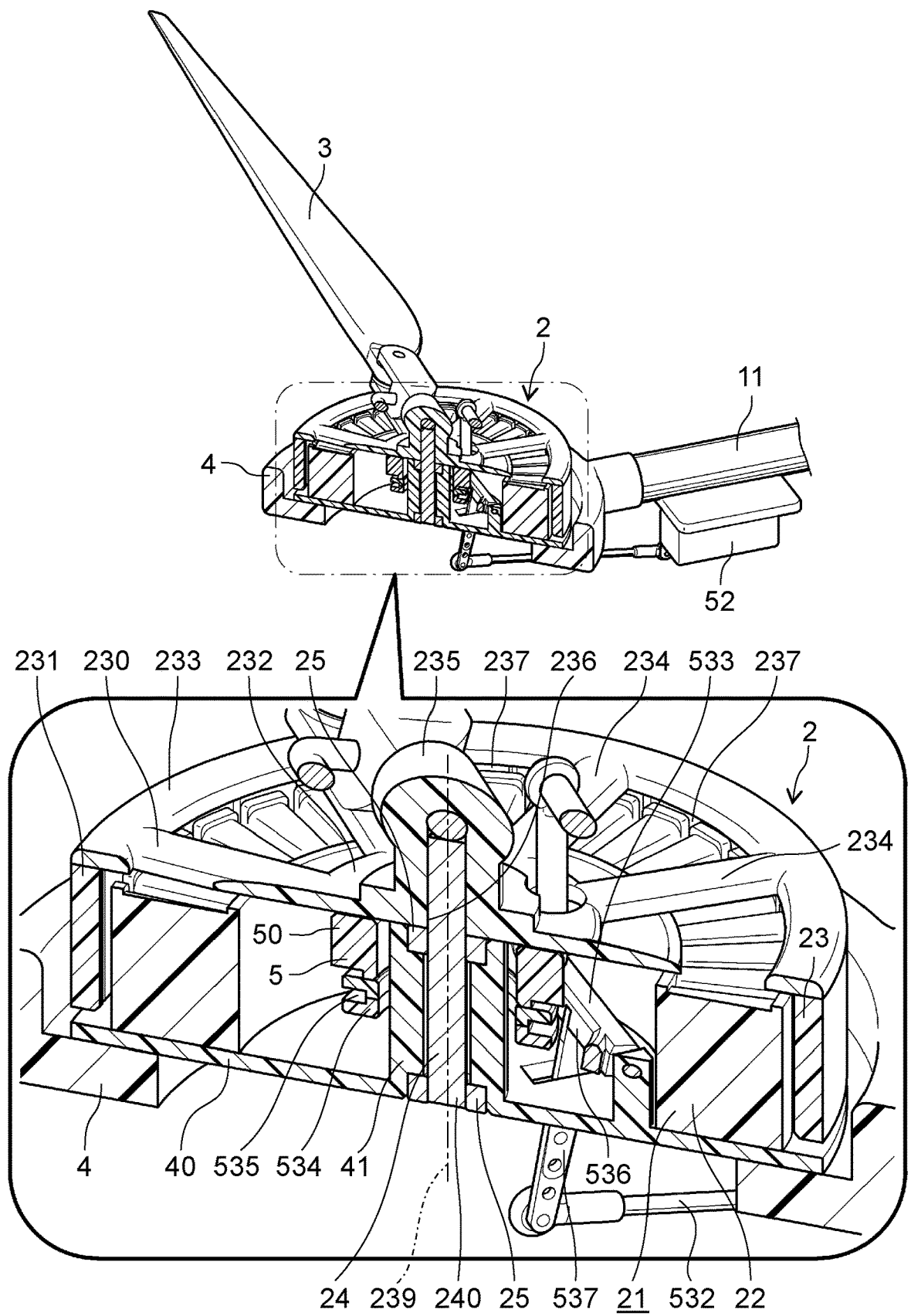
FIG. 3 is a perspective view illustrating a state in which a pitch angle of a blade included in the motor unit is maximized, and illustrating a part of the motor unit in a cross section.

Motor unit 2 illustrated in FIG. 1 is provided with first motor 21 including a brushless motor. First motor 21 may be a motor with a brush. FIG. 3 is a perspective view illustrating a state in which a pitch angle of blade 3 included in motor unit 2 according to the first exemplary embodiment is maximized, and illustrating a part of motor unit 2 in a cross section. As illustrated in FIG. 3, first motor 21 includes stator 22 and rotor 23. First motor 21 is a motor of outer rotor type. That is, rotor 23 is located outside of stator 22. Rotor 23 faces an outer peripheral surface of stator 22 with a slight gap interposed therebetween.

Motor unit 2 further includes base 4. Base 4 is coupled to arm 11. Stator 22 is fixed to base 4. Base 4 rotatably supports rotor 23.

Figure 4:
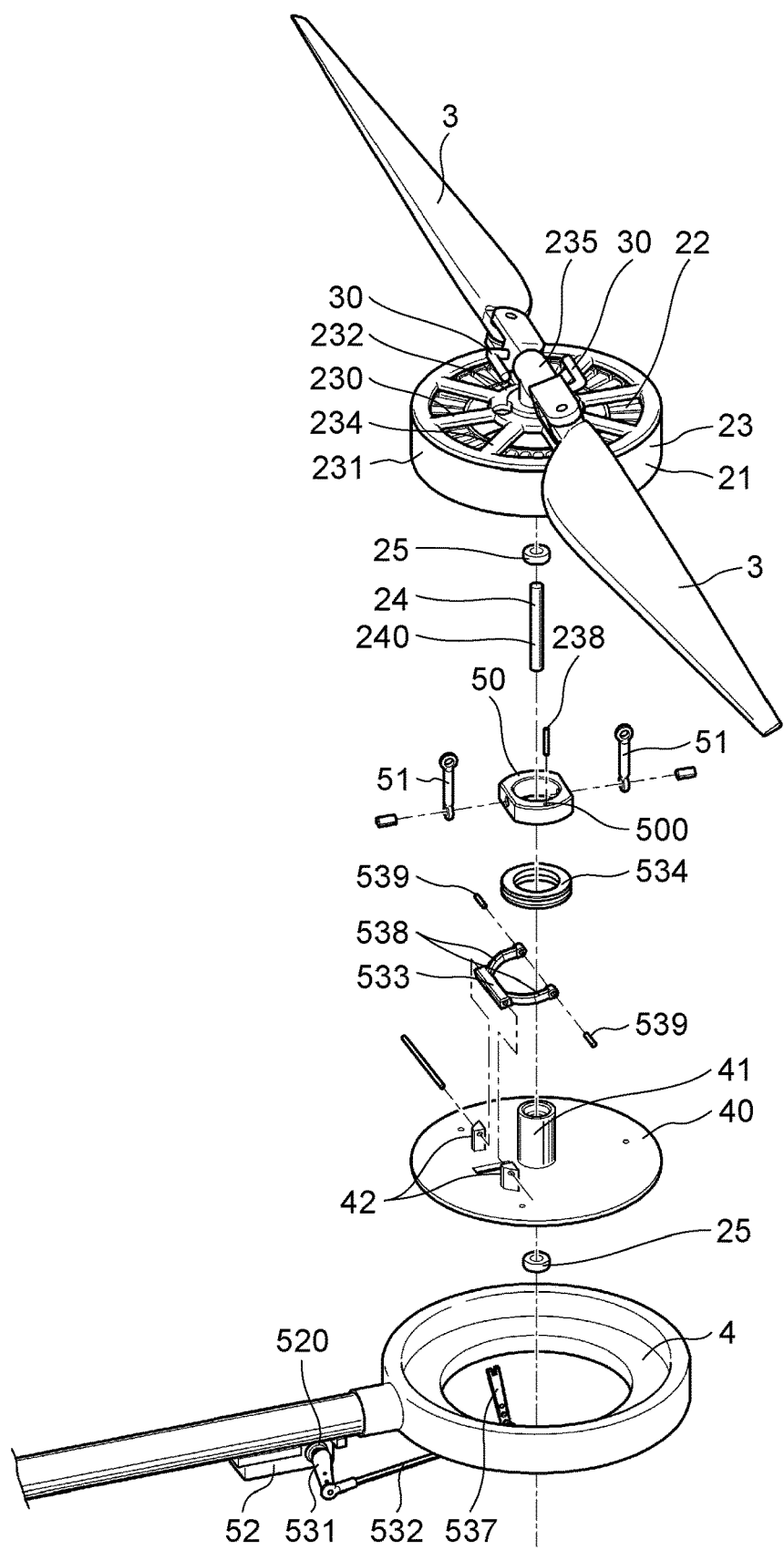
FIG. 4 is an exploded perspective view of the motor unit.

FIG. 4 is an exploded perspective view of motor unit 2 according to the first exemplary embodiment. As illustrated in FIG. 4, base 4 includes base plate 40. Base plate 40 has a plate shape whose thickness direction is parallel to the up-down direction. As illustrated in FIG. 3, stator 22 and rotor 23 are located above base plate 40 (close to blade 3).

Stator 22 is fixed to base plate 40 by a fixing tool such as a screw. Stator 22 has an annular shape concentric with base plate 40 having a circular shape when viewed in the up-down direction. Stator 22 includes, for example, a stator core and a stator coil wound around the stator core. First motor 21 of outer rotor type can secure a large region around which the stator coil is wound in the stator core as compared with a motor of inner rotor type. Therefore, in first motor 21, the stator coil is easily wound around the stator core, and stator 22 is easily manufactured.

As illustrated in FIG. 4, base 4 further includes support (support member) 41. Support 41 protrudes upward from a center of base plate 40. Support 41 has a cylindrical shape whose axial direction is parallel to the up-down direction. Support 41 is located inside stator 22 having an annular shape. That is, support 41 is located in a hole formed inside of stator 22 and penetrating in the up-down direction. Support 41 overlaps with stator 22 when viewed in a direction orthogonal to the up-down direction. Support 41 may be formed integrally with base plate 40 or may be attached to base plate 40.

Motor unit 2 further includes shaft 24 that defines the rotation center of rotor 23. An axial direction of shaft 24 is parallel to the up-down direction. Shaft 24 includes supported portion 240 supported by base 4. Supported portion 240 includes a lower half part of shaft 24 (a part opposite to blade 3 in the axial direction of shaft 24).

As illustrated in FIG. 3, supported portion 240 is located inside of support 41 having a cylindrical shape. Motor unit 2 further includes a plurality of bearings 25 that supports shaft 24. Motor unit 2 according to the present exemplary embodiment includes, as the plurality of bearings 25, two bearings 25 located around an upper end of supported portion 240 of shaft 24 and around a lower end of supported portion 240 (a lower end of shaft 24). Each bearing 25 is, for example, a rolling bearing such as a ball bearing or a roller bearing. Each bearing 25 is not limited to the rolling bearing, and may be, for example, a sliding bearing. A number of bearings 25 included in motor unit 2 is not limited to two. For example, first motor 21 may include only one bearing 25 or three or more bearings 25. A part of each bearing 25 is located inside of stator 22. Note that each bearing 25 may be entirely located inside of stator 22 or need not be disposed inside of stator 22.

Supported portion 240 of shaft 24 is rotatably attached to support 41 via the plurality of bearings 25. Thus, shaft 24 is supported by base 4 so as to be rotatable axially in the up-down direction. At least a part of each bearing 25 is located inside of stator 22 having an annular shape.

Rotor 23 has a bottomed cylindrical shape opened downward. Rotor 23 covers stator 22 in a non-contact state. Rotor 23 has opposing portion 230 and peripheral wall 231. Opposing portion 230 is located above stator 22. Opposing portion 230 faces stator 22 with a slight gap interposed therebetween in the up-down direction.

Opposing portion 230 has center 232, peripheral edge 233, and a plurality of joining parts 234. Center 232 is located at a center of opposing portion 230 when viewed from above, and is located above support 41. Center 232 has connection 235 protruding upward from other parts of opposing portion 230. Fitting hole 236 opened downward is formed in connection 235.

A part of shaft 24 above supported portion 240 is fitted into fitting hole 236 and is fixed to rotor 23. Shaft 24 rotates together with rotor 23. Shaft 24 is located at the center of rotor 23 when viewed from above. A central axis of shaft 24 overlaps with axis 239 serving as the rotation center of rotor 23. Shaft 24 may be unrotatably fixed to base 4. In this case, rotor 23 is rotatably attached to shaft 24.

Peripheral edge 233 of opposing portion 230 has an annular shape when viewed from above. Peripheral edge 233 is located around center 232 at a distance from center 232. The plurality of joining parts 234 is arranged at intervals in a circumferential direction of rotor 23 (circumferential direction of peripheral edge 233) between center 232 and peripheral edge 233. The plurality of joining parts 234 joins center 232 and peripheral edge 233.

A plurality of holes 237 arranged in the circumferential direction of rotor 23 is formed in opposing portion 230. Each hole 237 is a space formed between joining parts 234 adjacent to each other in the circumferential direction of rotor 23. Each hole 237 penetrates opposing portion 230 in the up-down direction. The plurality of holes 237 communicates a space above opposing portion 230 with a space inside of rotor 23 (space surrounded by peripheral wall 231) located below opposing portion 230. Thus, heat generated in stator 22 is less likely to be trapped inside of rotor 23 where stator 22 is located. Wind generated by rotation of blade 3 easily passes through the plurality of holes 237 and enters inside of rotor 23. Therefore, stator 22 is less likely to have a high temperature.

Peripheral wall 231 of rotor 23 protrudes downward (toward stator 22) from peripheral edge 233 of opposing portion 230. Peripheral wall 231 has a cylindrical shape whose axial direction is parallel to the up-down direction. An inner peripheral surface of peripheral wall 231 faces stator 22 with a slight gap interposed therebetween.

Peripheral wall 231 includes, for example, a plurality of magnets arranged in the circumferential direction of rotor 23 or one magnet continuous in the circumferential direction of rotor 23. The plurality of magnets is arranged such that, for example, two adjacent magnets have different magnetic poles that are close to stator 22. For example, the one magnet is magnetized such that magnetic poles located close to stator 22 are alternately replaced in the circumferential direction of rotor 23. Rotor 23 rotates about shaft 24 by magnetic attractive force and repulsive force generated between a magnetic field formed by stator 22 and the plurality of or one magnet.

As illustrated in FIG. 1, motor unit 2 includes blade 3. Motor unit 2 according to the present exemplary embodiment includes two blades 3. A number of blades 3 included in motor unit 2 is not limited to two, and may be one or three or more. Motor unit 2 need not include blade 3. In this case, it is sufficient to attach a separately prepared blade to motor unit 2 when aircraft 1 is assembled.

Figure 5:
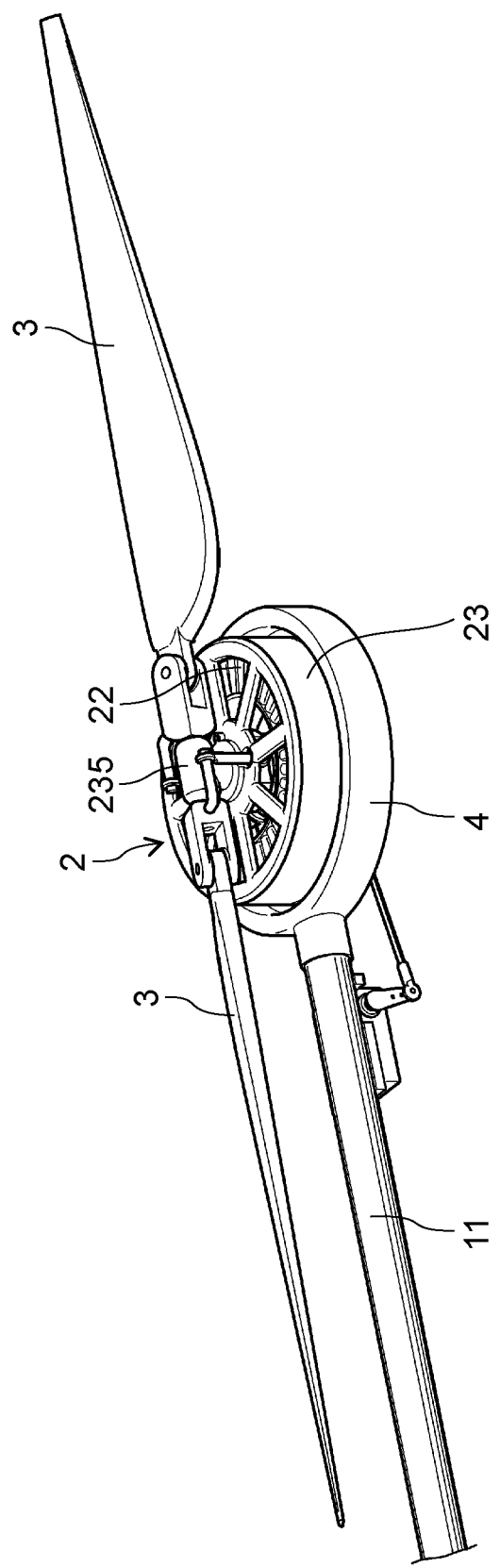
FIG. 5 is a perspective view of the motor unit, illustrating a state in which the blade is rotated by 90 degrees from a state illustrated in FIG. 1.

One end of each blade 3 in a length direction is connected to connection 235 of rotor 23. Each blade 3 is located above opposing portion 230 (opposite to stator 22). Each blade 3 protrudes outward from connection 235 when viewed from above. Each blade 3 according to the present exemplary embodiment protrudes further outward than an outer peripheral surface of peripheral wall 231 of rotor 23 when viewed from above. When rotor 23 rotates, blades 3 rotate (yaw) about axis 239 serving as the rotation center of rotor 23. FIG. 5 is a perspective view of motor unit 2 according to the first exemplary embodiment, illustrating a state in which blade 3 is rotated by 90 degrees from a state illustrated in FIG. 1.

Figure 6:
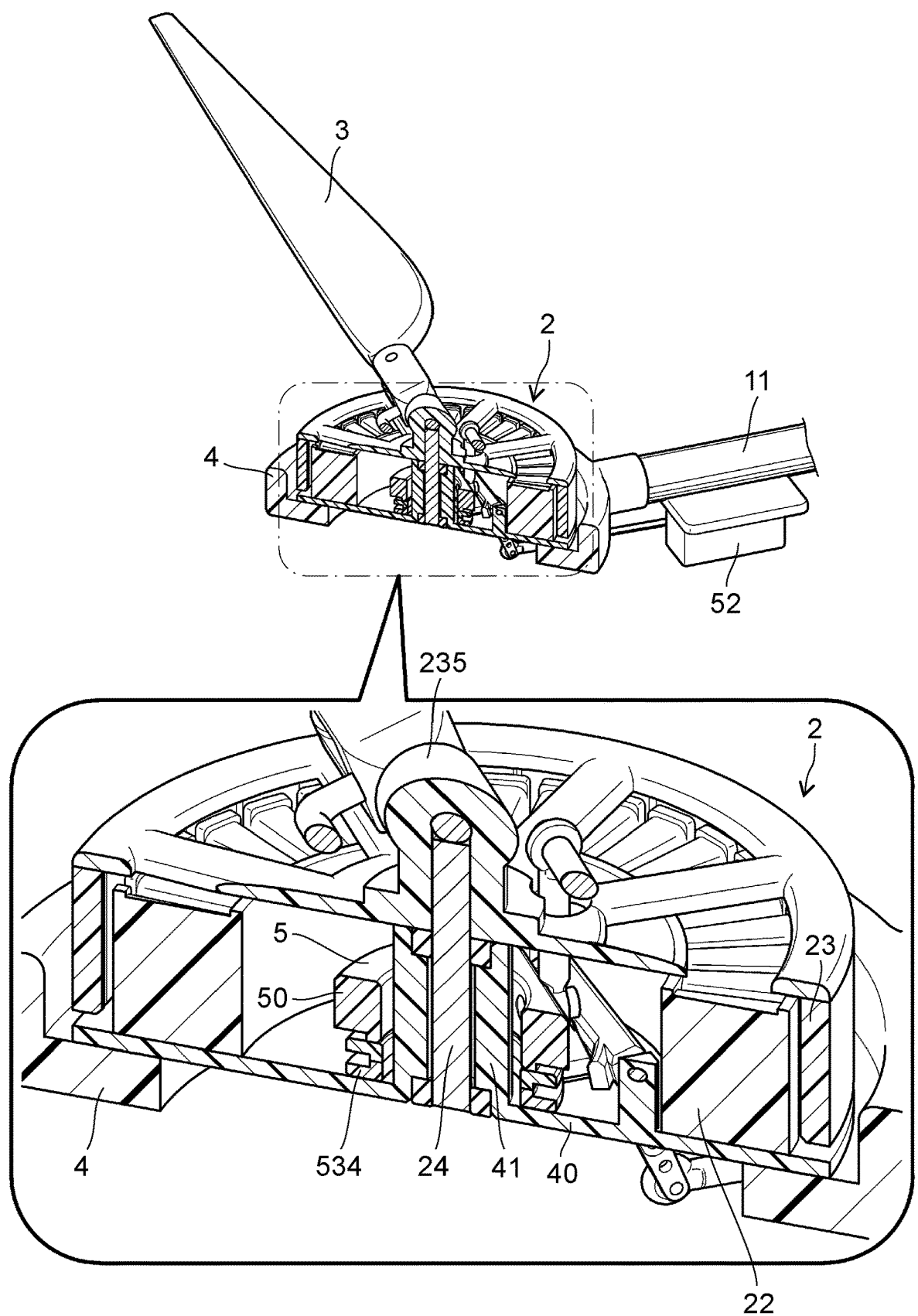
FIG. 6 is a perspective view illustrating a state in which the pitch angle of the blade of the motor unit is minimized and illustrating a part of the motor unit in a cross section.

Blade 3 is connected to connection 235 of rotor 23 so as to be rotatable about a rotation axis orthogonal to the up-down direction. That is, each blade 3 rotates (pitches) with respect to connection 235, and the pitch angle of each blade 3 changes. The "pitch angle" in the present disclosure means an angle of blade 3 with respect to a direction in which blade 3 rotates about axis 239. FIG. 6 is a perspective view illustrating a state in which the pitch angle of each blade 3 of motor unit 2 according to the first exemplary embodiment is minimized, and illustrating a part of motor unit 2 in a cross section.

Figure 7:
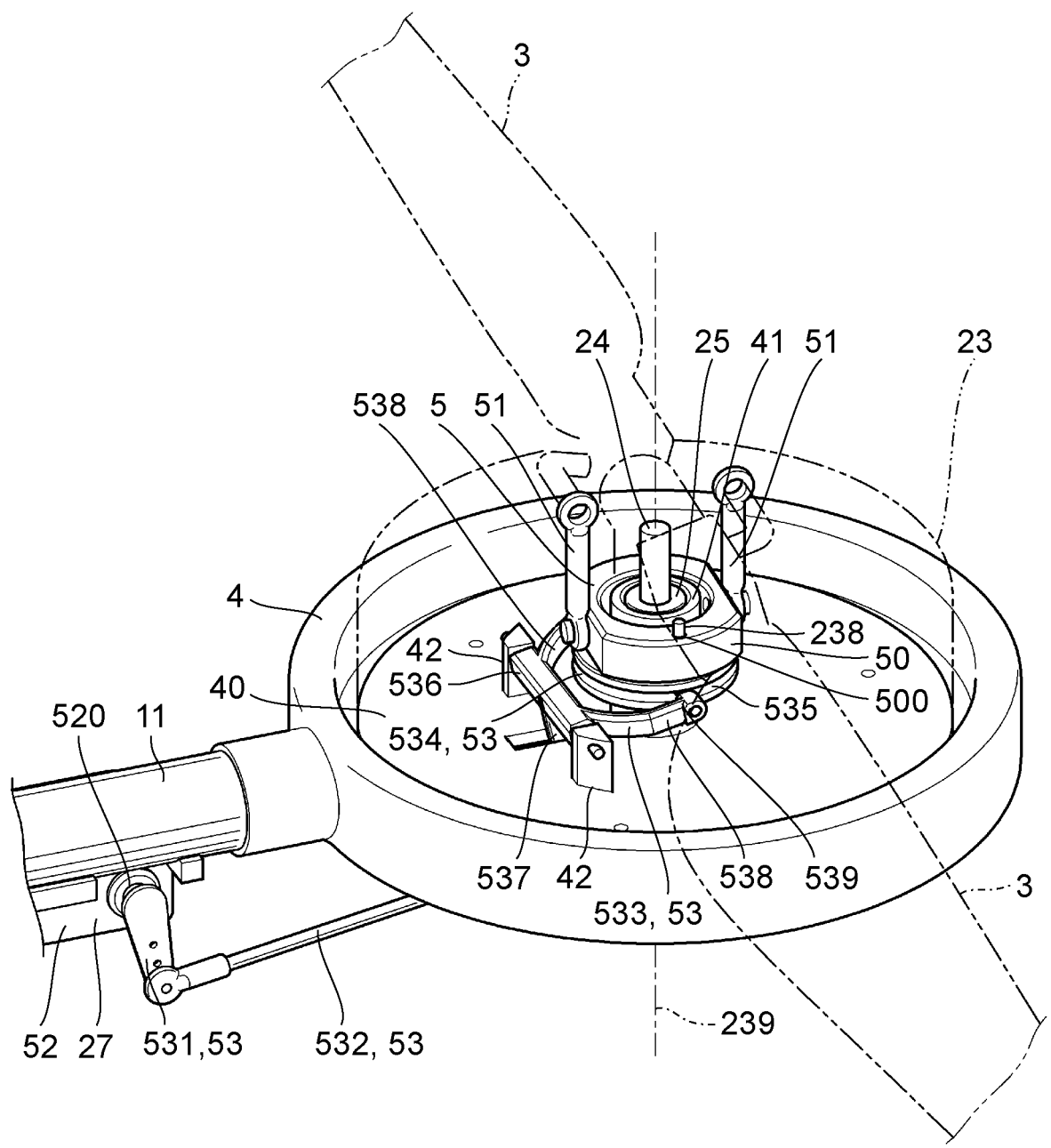
FIG. 7 is a perspective view in which the blade and a part of a rotor of the motor unit are not shown.

FIG. 7 is a perspective view in which blade 3 and a part of rotor 23 of motor unit 2 according to the first exemplary embodiment are not shown. Motor unit 2 includes pitch angle changing mechanism 5 illustrated in FIG. 7. Pitch angle changing mechanism 5 changes the pitch angle of each blade 3. Pitch angle changing mechanism 5 according to the present exemplary embodiment is a mechanism that performs collective pitch control. The collective pitch control is control for simultaneously changing the pitch angle of each blade 3 by the same amount, and is performed to control a thrust during rotation of each blade 3. Note that pitch angle changing mechanism 5 according to the present exemplary embodiment does not perform cyclic pitch control described later.

Pitch angle changing mechanism 5 includes a displaceable displacement member. Pitch angle changing mechanism 5 according to the present exemplary embodiment includes, as displacement members, moving member 50, coupling member 51, lever 533, and interlocking member 534, which will be described later.

Pitch angle changing mechanism 5 includes moving member 50 that moves in the up-down direction. Moving member 50 is coupled to the plurality of blades 3. When rotor 23 rotates, moving member 50 rotates about axis 239 of rotor 23 together with the plurality of blades 3. The pitch angle (collective pitch angle) of each blade 3 changes as moving member 50 moves in the up-down direction.

Moving member 50 is located between base plate 40 and opposing portion 230 (see FIG. 3) of rotor 23. Moving member 50 is located inside of stator 22 having an annular shape (see FIG. 3). Moving member 50 has an annular shape when viewed from above. Moving member 50 is located around support 41 of base 4. That is, moving member 50 is located between shaft 24 located inside of support 41 and stator 22.

Rotor 23 includes guide 238 that guides movement of moving member 50 in the up-down direction. Guide 238 is a columnar pin protruding downward from center 232 of opposing portion 230. Guide 238 may be formed integrally with rotor 23 or may be attached to rotor 23. Note that guide 238 that guides the movement of moving member 50 in the up-down direction is not limited to a pin. For example, an outer peripheral surface of support 41 of base 4 may come into contact with an inner peripheral surface of moving member 50, and thus a moving direction of moving member 50 may be restricted to the up-down direction. That is, in this case, support 41 is used as guide 238.

Hole 500 (see FIG. 4) opened upward is formed in moving member 50. Guide 238 is located in hole 500 of moving member 50. When an inner peripheral surface of hole 500 is in contact with an outer peripheral surface of guide 238, the moving direction of moving member 50 is restricted to the up-down direction.

Moving member 50 as a whole is located inside of stator 22 at substantially all positions in a moving range in the up-down direction of moving member 50. Thus, for example, an increase in size of motor unit 2 in the up-down direction is suppressed as compared with a case where moving member 50 as a whole is disposed above stator 22. By suppressing an increase in size of motor unit 2 in the up-down direction in this manner, each blade 3 can be disposed close to stator 22 and rotor 23 in the up-down direction. It is therefore possible to suppress vibration of an end of shaft 24 close to rotor 23 during rotation of rotor 23 while shortening a length of shaft 24 in the up-down direction. Therefore, deformation of shaft 24 due to cross wind or the like can be suppressed, and an increase in size of shaft 24 and bearing 25 supporting shaft 24 can be suppressed. The wind generated by each blade 3 easily hits first motor 21, and can cool first motor 21 efficiently. The vibration of each blade 3 during the flight of aircraft 1 is also suppressed. Thus, during the flight of aircraft 1, data can be accurately acquired by the sensors included in the flight controller. A size of a cushion, such as sponge and rubber, for protecting the control unit of aircraft 1 can be reduced, or the cushion can be omitted.

Note that a part of moving member 50 is located above stator 22 only when moving member 50 is located at an upper end in the moving range in the up-down direction. However, moving member 50 as a whole may be disposed inside of stator 22 at all positions in the moving range in the up-down direction. A part of moving member 50 may be located below stator 22 only when moving member 50 is located at a lower end in the moving range in the up-down direction. That is, it is sufficient that at least a part of moving member 50 is disposed inside of stator 22.

Pitch angle changing mechanism 5 includes at least one coupling member 51. Pitch angle changing mechanism 5 according to the present exemplary embodiment includes as many coupling members 51 as blades 3 included in motor unit 2. That is, pitch angle changing mechanism 5 includes two coupling members 51. A number of coupling members 51 is not limited, and can be changed in accordance with the number of blades 3. For example, pitch angle changing mechanism 5 may include only one coupling member 51 or three or more coupling members 51.

The plurality of coupling members 51 corresponds to the plurality of blades 3 on a one-to-one basis. Each coupling member 51 couples moving member 50 and corresponding blade 3. That is, moving member 50 according to the present exemplary embodiment is indirectly coupled to the plurality of blades 3 via the plurality of coupling members 51. Moving member 50 may be directly coupled to the plurality of blades 3, and coupling member 51 can be omitted.

Each coupling member 51 is located above base plate 40. Each coupling member 51 has a rod shape extending in the up-down direction. The lower end of each coupling member 51 is located around moving member 50. As illustrated in FIG. 1, each coupling member 51 penetrates center 232 of opposing portion 230 in rotor 23 in the up-down direction.

Each blade 3 has coupling portion 30 to which corresponding coupling member 51 is coupled. Coupling portion 30 has a rod shape bent in an L shape. Coupling portion 30 protrudes from an end of blade 3 close to connection 235 in a rotation direction of blade 3. An upper end (opposite to base plate 40) of each coupling member 51 is rotatably coupled to a distal end of coupling portion 30 of corresponding blade 3. As illustrated in FIG. 7, the lower end (close to base plate 40) of each coupling member 51 is rotatably coupled to moving member 50. Each coupling member 51 moves in the up-down direction together with moving member 50. As each coupling member 51 moves in the up-down direction together with moving member 50, corresponding blade 3 rotates with respect to connection 235, and the pitch angle changes.

Pitch angle changing mechanism 5 includes driver 27 that drives moving member 50. Driver 27 includes motor 52 as a power source for moving member 50, and transmission mechanism 53 that transmits power generated by motor 52 to moving member 50 to move moving member 50 in the up-down direction. Hereinafter, motor 52 is referred to as second motor 52.

Figure 8:
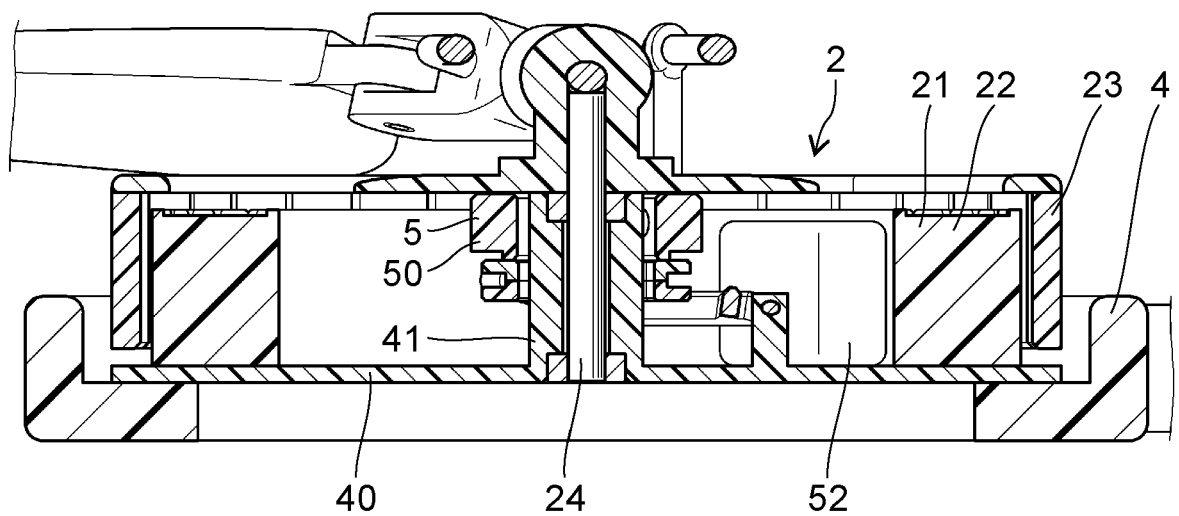
FIG. 8 is a sectional view of a motor unit according to a modification.

Second motor 52 is, for example, a servomotor. Second motor 52 is not limited to a servomotor, and may be, for example, a hydraulic motor or the like. Second motor 52 is attached to corresponding arm 11. Second motor 52 has output shaft 520 extending in a direction perpendicular to the up-down direction. Second motor 52 according to the present exemplary embodiment is not located inside of stator 22. However, as illustrated in FIG. 8, all or a part of second motor 52 may be located inside of stator 22. FIG. 8 is a sectional view of a motor unit according to a modification. In an example illustrated in FIG. 8, second motor 52 as a whole is located inside of stator 22.

As illustrated in FIG. 7, transmission mechanism 53 according to the present exemplary embodiment includes first link 531, second link 532, lever 533, and interlocking member 534. The power generated by second motor 52 is transmitted to moving member 50 via first link 531, second link 532, lever 533, and interlocking member 534 in that order. As a result, moving member 50 moves in the up-down direction.

One end of first link 531 is coupled to output shaft 520 of second motor 52. An end of first link 531 opposite to output shaft 520 is rotatably attached to one end of second link 532. Lever 533 is rotatably attached to base 4 above base plate 40. An end of second link 532 opposite to first link 531 is rotatably attached to lever 533 below base plate 40 (opposite to blade 3).

Interlocking member 534 is located below moving member 50. Interlocking member 534 has an annular shape when viewed from above. Interlocking member 534 is located around support 41 of base 4. Interlocking member 534 is located between moving member 50 and base plate 40. Interlocking member 534 is movable in the up-down direction along the outer peripheral surface of support 41. That is, interlocking member 534 is also a moving member movable in the up-down direction. When interlocking member 534 moves upward, moving member 50 is pushed and moved upward by interlocking member 534. As interlocking member 534 moves downward, moving member 50 moves downward by a weight of moving member 50, a pair of coupling members 51, and a pair of blades 3. Interlocking member 534 according to the present exemplary embodiment is not fixed to moving member 50, but may be fixed to moving member 50. Interlocking member 534 may be formed integrally with moving member 50.

Interlocking member 534 as a whole is disposed inside of stator 22 at all positions in a moving range of interlocking member 534 in the up-down direction. Interlocking member 534 may be partially located inside of stator 22, or need not be disposed inside of stator 22. Groove 535 extending over an entire circumferential length of interlocking member 534 is formed on an outer peripheral surface of interlocking member 534.

Base 4 includes a pair of supports 42 protruding upward from base plate 40. The pair of supports 42 is located inside of stator 22.

Lever 533 includes fulcrum 536, lever piece 537, and a pair of arm pieces 538. Fulcrum 536 is located between the pair of supports 42. Fulcrum 536 is attached to the pair of supports 42 so as to be rotatable about a rotation axis parallel to output shaft 520.

Lever piece 537 protrudes downward from fulcrum 536. Lever piece 537 penetrates base plate 40 in the up-down direction. As illustrated in FIG. 3, a distal end (lower end) of lever piece 537 protrudes downward from base plate 40. The end of second link 532 opposite to first link 531 is rotatably coupled to the distal end of lever piece 537. In lever 533, the other part except for the distal end of lever piece 537 is located inside of stator 22. Although only a part of lever 533 is located inside of stator 22, lever 533 as a whole may be located inside of stator 22. Lever 533 need not be disposed inside of stator 22. First link 531 and second link 532 are not disposed inside of stator 22, but may be disposed inside of stator 22.

As illustrated in FIG. 7, the pair of arm pieces 538 protrudes from fulcrum 536 in a direction intersecting the rotation axis of fulcrum 536. The pair of arm pieces 538 is arranged at intervals in a direction of the rotation axis of fulcrum 536. Interlocking member 534 is located between the pair of arm pieces 538. Protrusion 539 (see FIG. 4) protruding toward interlocking member 534 is formed at a distal end of each arm piece 538. Projection 539 of each arm piece 538 is slidably fitted into groove 535 of interlocking member 534 in a length direction of groove 535.

A rotational motion of output shaft 520 of second motor 52 is converted into a rotational motion of lever 533 about fulcrum 536 as a rotation center via first link 531 and second link 532. When second motor 52 is driven, output shaft 520 alternately rotates in one direction and in a direction opposite to the one direction. Thus, when second motor 52 is driven, lever 533 swings about the rotation axis of fulcrum 536. When lever 533 swings in this manner, the pair of arm pieces 538 of lever 533 swings in the up-down direction about fulcrum 536, and interlocking member 534 is moved in the up-down direction by protrusion 539 of each arm piece 538. As interlocking member 534 moves in the up-down direction in this manner, moving member 50 moves in the up-down direction as described above, and the pitch angle of each blade 3 is changed. That is, lever 533 moves moving member 50 in the direction in which axis 239 extends.

During the flight of aircraft 1 illustrated in FIG. 2, for example, first motor 21 (see FIG. 3) and second motor 52 (see FIG. 3) of each motor unit 2 are simultaneously driven. As a result, in each motor unit 2, each blade 3 rotates about axis 239 while changing the pitch angle.

(2) Second Exemplary Embodiment

A second exemplary embodiment will be described. Hereinafter, each element of the second exemplary embodiment is denoted by a reference mark obtained by adding "A" to the end of the reference mark assigned to the corresponding element of the first exemplary embodiment, and description of the matters same as the corresponding element of the first exemplary embodiment will be omitted.

Figure 9:
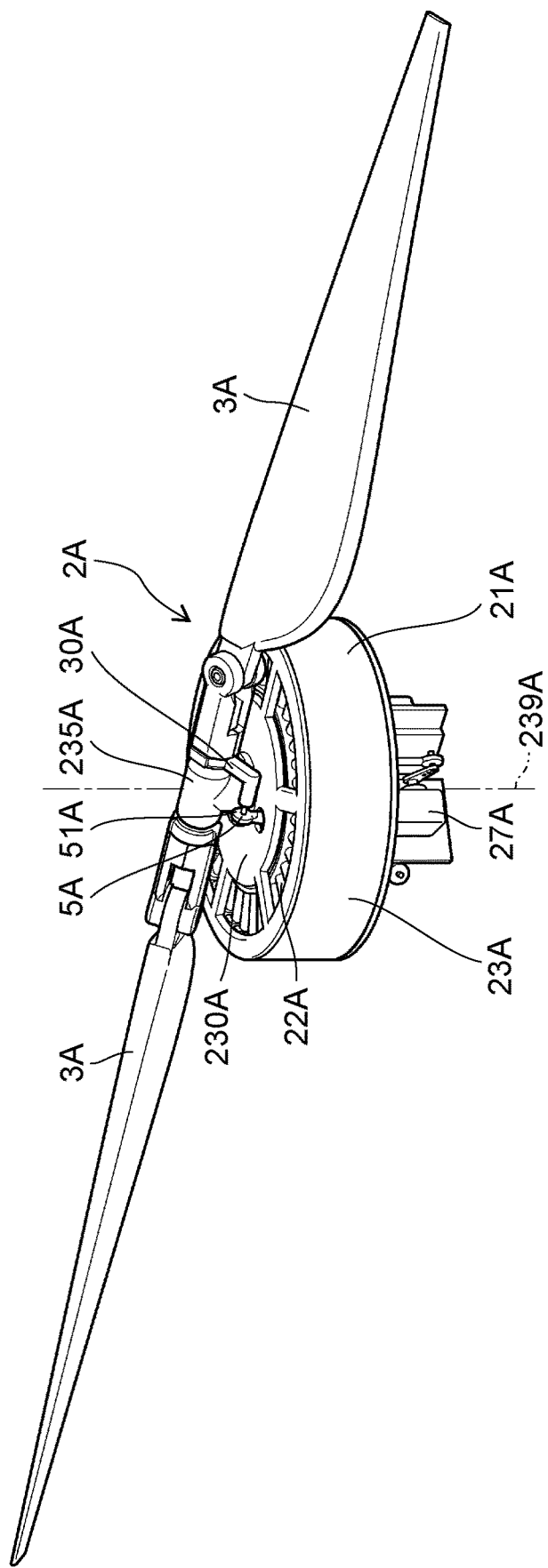
FIG. 9 is a perspective view of a motor unit according to a second exemplary embodiment.

FIG. 9 is a perspective view of motor unit 2A according to the second exemplary embodiment. Pitch angle changing mechanism 5A included in motor unit 2A according to the present exemplary embodiment can execute both collective pitch control and cyclic pitch control. The cyclic pitch control is control for periodically changing a pitch angle of blade 3A with a rotation of blade 3A. In the cyclic pitch control, the pitch angle of blade 3A is continuously changed with one rotation of blade 3A as a cycle.

Figure 10:
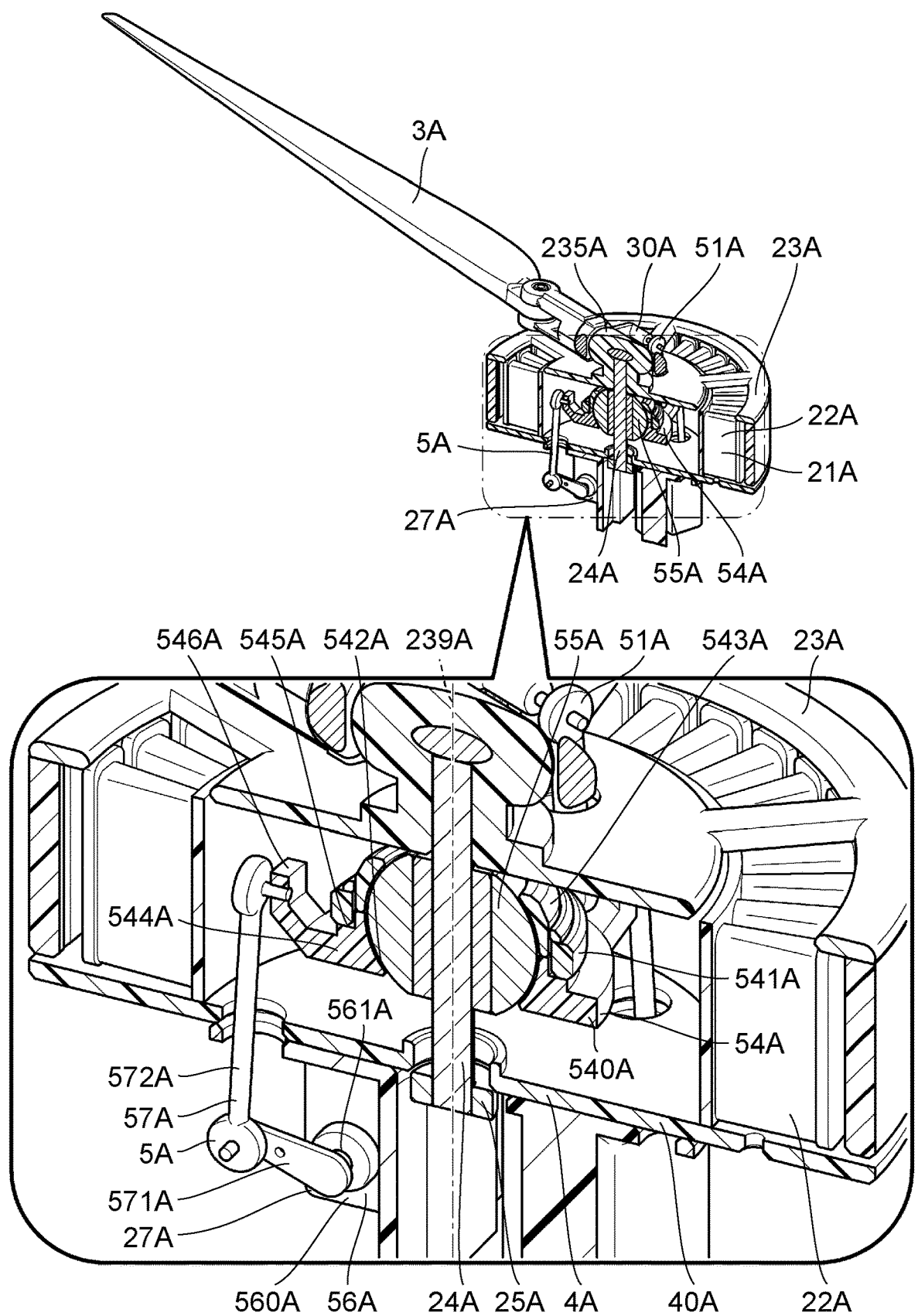
FIG. 10 is a perspective view illustrating a state in which a swash plate included in the motor unit is raised to a maximum and illustrating a part of the motor unit in a cross section.

FIG. 10 is a perspective view illustrating a state in which swash plate 54A included in motor unit 2A according to the second exemplary embodiment is raised to a maximum, and illustrating a part of motor unit 2A in a cross section. As illustrated in FIG. 10, a lower end of shaft 24A is rotatably supported by base plate 40A via bearing 25A. As a result, shaft 24A is supported so as to be rotatable axially in the up-down direction with respect to base 4A.

Figure 11:
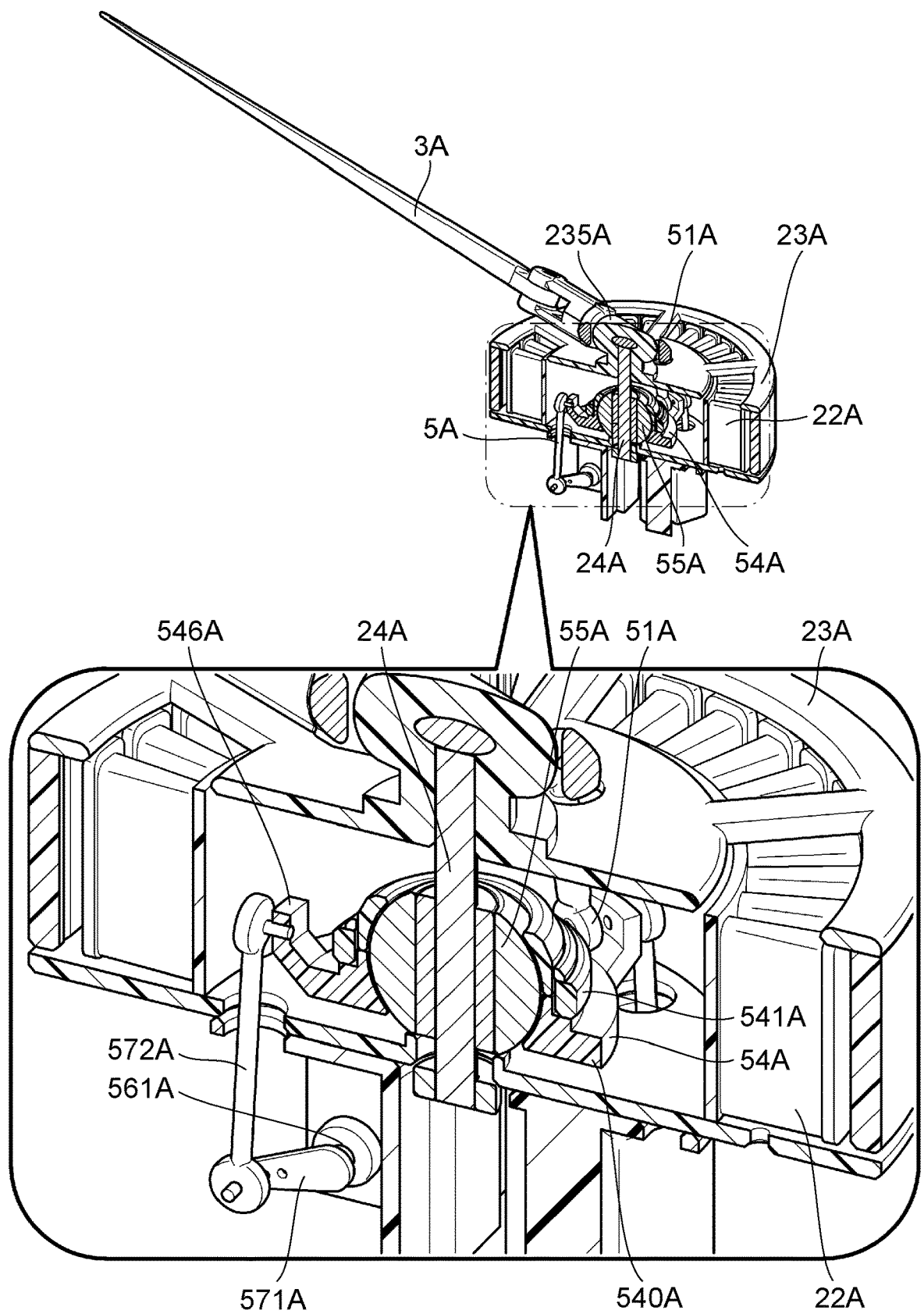
FIG. 11 is a perspective view illustrating a state in which the swash plate of the motor unit is lowered to a maximum and illustrating a part of the motor unit in a cross section.
Figure 12:
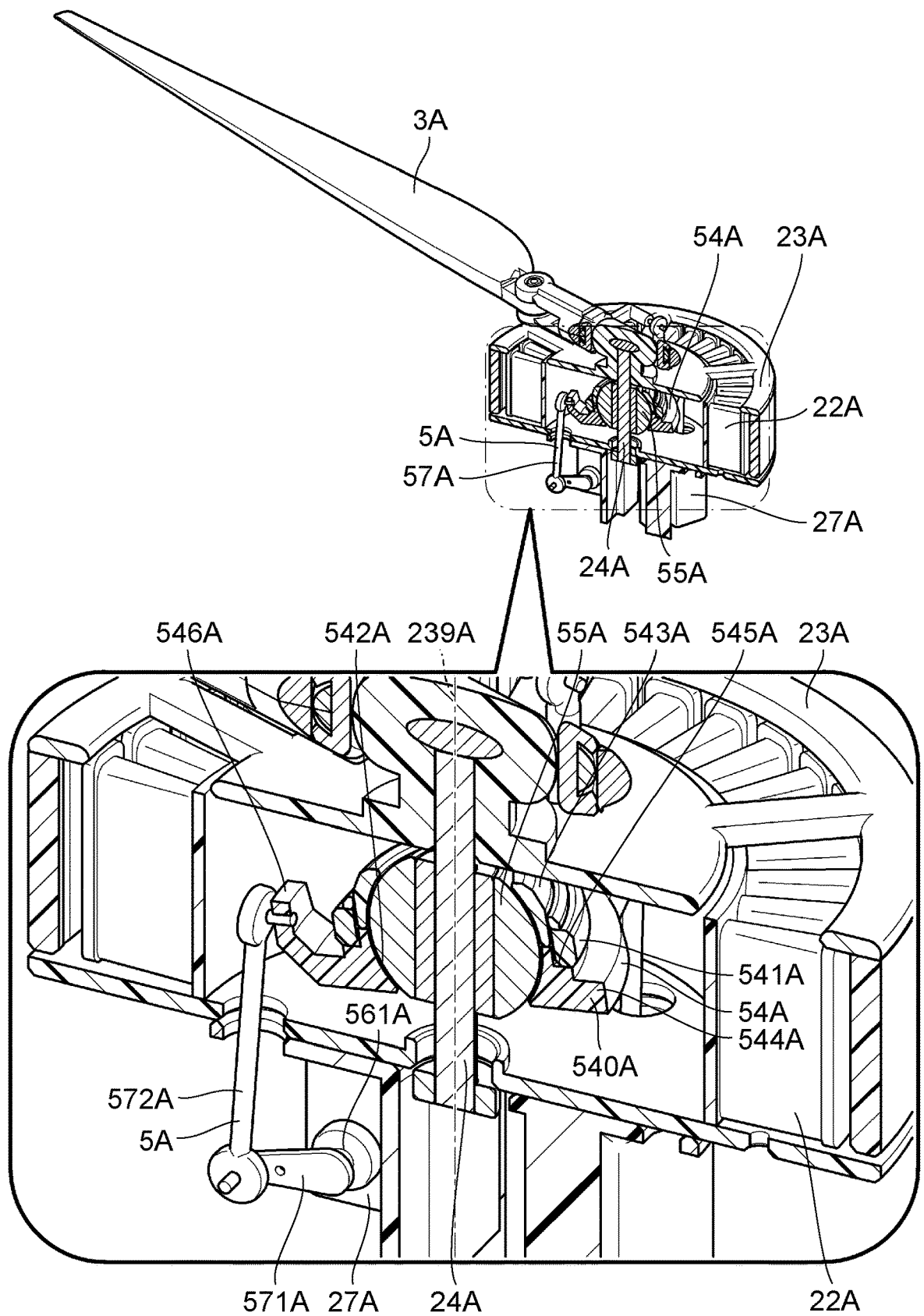
FIG. 12 is a perspective view illustrating a state in which the swash plate of the motor unit is inclined and illustrating a part of the motor unit in a cross section.

Pitch angle changing mechanism 5A includes swash plate 54A as a displacement member. FIG. 11 is a perspective view illustrating a state in which swash plate 54A of motor unit 2A according to the second exemplary embodiment is lowered to a maximum and illustrating a part of motor unit 2A in a cross section. As illustrated in FIGS. 10 and 11, the collective pitch control is performed by moving swash plate 54A in the up-down direction. FIG. 12 is a perspective view illustrating a state in which swash plate 54A of motor unit 2A according to the second exemplary embodiment is inclined and illustrating a part of motor unit 2A in a cross section. As illustrated in FIG. 12, the cyclic pitch control is performed by changing an inclination of swash plate 54A with respect to axis 239A of rotor 23A.

As illustrated in FIG. 10, pitch angle changing mechanism 5A includes ball joint 55A. Ball joint 55A is supported so as to be movable in the up-down direction with respect to a part of shaft 24A protruding upward from base plate 40A.

Ball joint 55A as a whole is located inside of stator 22A at all positions in a moving range of ball joint 55A in the up-down direction. Only a part of ball joint 55A may be located inside of stator 22A. Ball joint 55A has a spherical outer surface.

Swash plate 54A includes a support member (lower ring) 540A and rotating member (upper ring) 541A. Support member 540A has an annular shape. Support member 540A is formed by combining, for example, two members divided into upper and lower parts. Hole 542A penetrating support member 540A in the up-down direction is formed in support member 540A. An inner peripheral surface defining hole 542A of support member 540A is a concave curved surface along a spherical surface.

Ball joint 55A is fitted into hole 542A of support member 540A. Ball joint 55A supports support member 540A so as to be rotatable with three degrees of freedom. However, a rotation of support member 540A about axis 239A of rotor 23A with respect to ball joint 55A is restricted by rotation restricting member 43A (see FIG. 13) to be described later. Therefore, support member 540A rotates with two degrees of freedom with respect to ball joint 55A.

Figure 13:
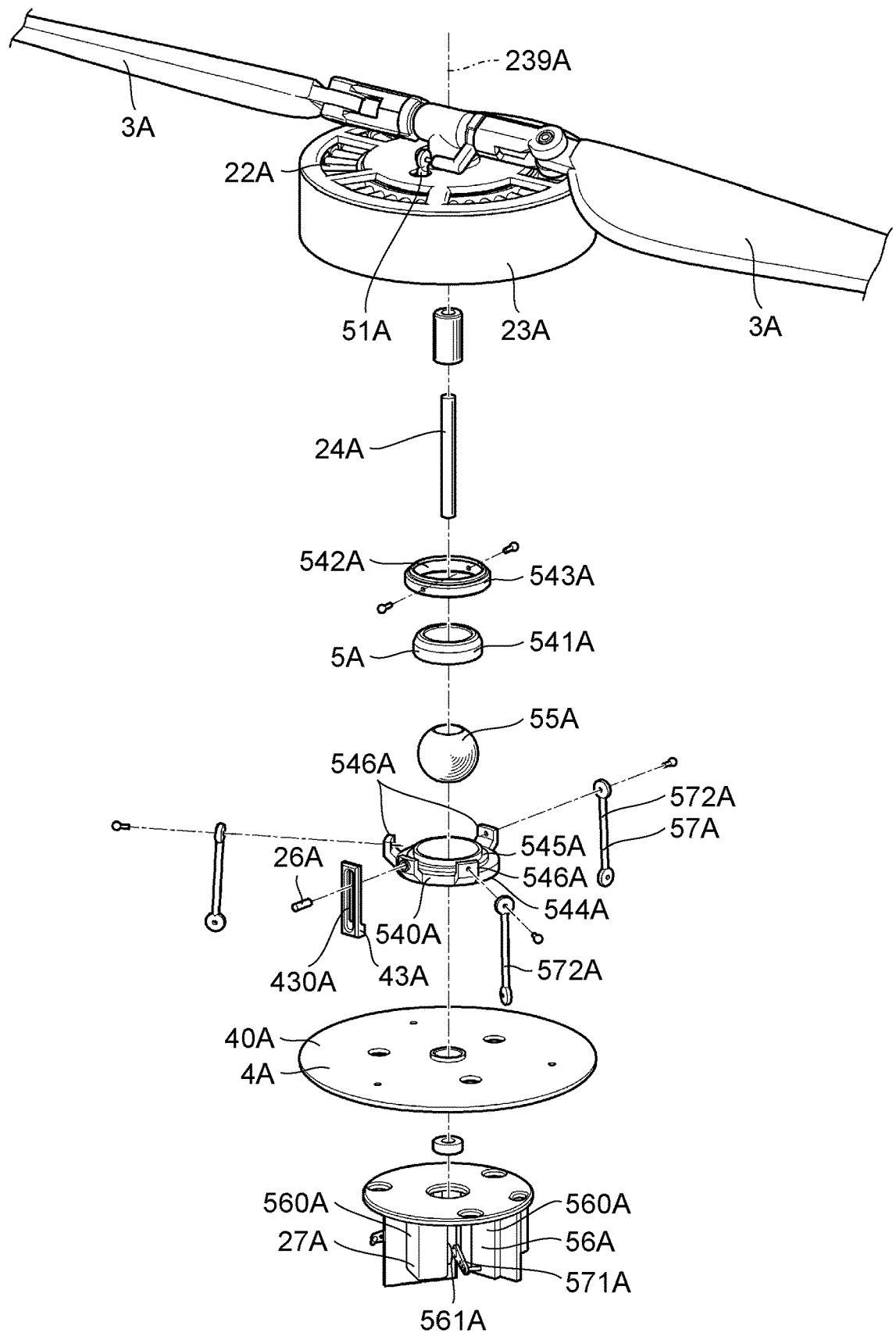
FIG. 13 is an exploded perspective view of the motor unit.

FIG. 13 is an exploded perspective view of motor unit 2A according to the second exemplary embodiment. As illustrated in FIG. 13, base 4A includes rotation restricting member 43A. Rotation restricting member 43A restricts support member 540A from rotating about axis 239A of rotor 23A. Rotation restricting member 43A is attached to an upper surface of base plate 40A. Rotation restricting member 43A protrudes upward from base plate 40A. Rotation restricting member 43A is located inside of stator 22A. Long hole 430A extending in the up-down direction is formed in rotation restricting member 43A. Rotation restricting member 43A may be formed integrally with base plate 40A.

Pitch angle changing mechanism 5A includes contact member 26A. Contact member 26A is attached to support member 540A. Contact member 26A may be formed integrally with support member 540A. Contact member 26A has a columnar shape extending in a direction orthogonal to axis 239A of rotor 23A. Contact member 26A protrudes outward from support member 540A. Contact member 26A is fitted into long hole 43A of rotation restricting member 430A so as to be movable in the up-down direction. The rotation of support member 540A about axis 239A of rotor 23A is restricted by contact of contact member 26A with an edge of long hole 430A of rotation restricting member 43A.

As illustrated in FIG. 10, support member 540A includes ring 543A and base 544A. Ring 543A is located above base 544A. Ring 543A is attached to base 544A. Ring 543A and base 544A each have an annular shape having a hole penetrating in the up-down direction. Ring 543A is located on an inner peripheral edge of base 544A. The hole formed inside of ring 543A communicates with the hole formed inside of base 544A, and both the holes form hole 542A described above. Contact member 26A (see FIG. 13) described above is attached to base 544A.

Base 544A has support surface 545A that supports rotating member 541A. Support surface 545A is a flat surface having an annular shape when viewed in the up-down direction. Support surface 545A is located outside of ring 543A on an upper surface of base 544A. Support surface 545A is orthogonal to a central axis of support member 540A. A position of support surface 545A in the up-down direction is changed by moving support member 540A in the up-down direction together with ball joint 55A with respect to shaft 24A. Support member 540A as a whole is located inside of stator 22A at all positions in a moving range of support member 540A in the up-down direction. Only a part of support member 540A may be located inside of stator 22A.

A direction of support surface 545A is changed by rotating support member 540A with respect to ball joint 55A. The direction of support surface 545A can be changed to a direction including any of forward, backward, leftward, and rightward direction components orthogonal to axis 239A of rotor 23A. Further, a degree of inclination of support surface 545A with respect to the up-down direction (direction of axis 239A) can be changed by rotating support member 540A with respect to ball joint 55A.

Rotating member 541A has a ring shape surrounding ring 543A of support member 540A. Rotating member 541A is supported from below by support surface 545A of base 544A. Rotating member 541A is rotatable about axis 239A of rotor 23A with respect to support member 540A in a state where a lower surface of rotating member 541A is along support surface 545A and an inner peripheral surface of rotating member 541A is along the outer peripheral surface of ring 543A.

When support member 540A moves in the up-down direction together with ball joint 55A with respect to shaft 24A, rotating member 541A supported by support member 540A moves in the up-down direction. That is, ball joint 55A, support member 540A, and rotating member 541A are moving members movable in the up-down direction.

When support member 540A rotates with respect to ball joint 55A so as to change the direction of support surface 545A, a central axis direction of rotating member 541A changes. Rotating member 541A as a whole is located inside of stator 22A at all positions in the moving range of rotating member 541A in the up-down direction. Note that only a part of rotating member 541A may be located inside of stator 22A.

Similarly to moving member 50 according to the first exemplary embodiment, rotating member 541A is indirectly coupled to a plurality of blades 3A via the plurality of coupling members 51A. Therefore, when rotor 23A rotates, rotating member 541A rotates about axis 239A of rotor 23A together with the plurality of blades 3A. Rotating member 541A may be directly coupled to the plurality of blades 3A. In this case, coupling members 51A can be omitted.

Coupling portion 30A of each blade 3A protrudes from an end of each blade 3A close to connection 235A in a direction opposite to a rotation direction of blade 3A. An upper end of each coupling member 51A is rotatably coupled to a distal end of coupling portion 30A of corresponding blade 3A. A lower end of each coupling member 51A is rotatably coupled to rotating member 541A.

As illustrated in FIGS. 10 and 11, when swash plate 54A moves in the up-down direction with respect to shaft 24A, each coupling member 51A moves in the up-down direction together with rotating member 541A. At this time, blade 3A corresponding to each coupling member 51A rotates about a rotation axis orthogonal to the up-down direction with respect to connection 235A. This changes the pitch angle (collective pitch angle) of each blade 3A.

As illustrated in FIG. 12, when the direction of support surface 545A of support member 540A is inclined with respect to the up-down direction and the central axis direction of rotating member 541A is inclined with respect to the up-down direction, the pitch angle of each blade 3A periodically and continuously changes with one rotation about axis 239A of each blade 3A as a cycle. As a result, the above-described cyclic pitch control is performed. For example, when support surface 545A is inclined downward to the right, the pitch angle of blade 3A is maximized in a state where blade 3A is located on the right side of connection 235A of rotor 23A, and is minimized in a state where blade 3A is located on the left side of connection 235A.

As described above, the direction of support surface 545A of support member 540A can be changed to any of forward, backward, leftward, and rightward direction components. Therefore, when each blade 3A makes one rotation about axis 239A, a rotational position of each blade 3A when the pitch angle of each blade 3A is maximized and minimized can be changed to all rotational positions.

Note that the rotational position of each blade 3A when the pitch angle of each blade 3A is maximized and minimized need not be changeable to all the rotational positions. For example, the rotational position of each blade 3A when the pitch angle of each blade 3A is maximized and minimized may be changeable only to positions on the front side and the rear side of connection 235A, or may be changeable only to positions on the left side and the right side of connection 235A.

In the cyclic pitch control described above, a maximum angle and a minimum angle of the pitch angle of each blade 3A when each blade 3A makes one rotation about axis 239A can be changed by changing the degree of inclination of support surface 545A with respect to the up-down direction.

As illustrated in FIGS. 10 and 13, pitch angle changing mechanism 5A includes driver 27A that drives support member 540A. Driver 27A can move support member 540A in the up-down direction. Further, driver 27A can rotate support member 540A with respect to ball joint 55A so as to change the direction of support surface 545A.

Driver 27A includes power source 56A for support member 540A and transmission mechanism 57A that transmits power generated by power source 56A to support member 540A to drive support member 540A.

Power source 56A includes a plurality of motors 560A. Hereinafter, motors 560A are referred to as second motors 560A. Each second motor 560A is, for example, a servomotor. Each second motor 560A is not limited to a servomotor, and may be, for example, a hydraulic motor or the like.

Power source 56A includes three second motors 560A as the plurality of second motors 560A. Each second motor 560A is attached in contact with a lower surface of base plate 40A or via another member. The plurality of second motors 560A is disposed at equal intervals in a rotation direction of rotor 23A about axis 239A of rotor 23A when viewed in the up-down direction. Each second motor 560A includes output shaft 561A extending in a direction perpendicular to the up-down direction.

Although each second motor 560A according to the present exemplary embodiment is not located inside of stator 22A, all or a part of each second motor 560A may be located inside of stator 22A.

Transmission mechanism 57A includes first links 571A as many as second motors 560A and second links 572A as many as second motors 560A. That is, transmission mechanism 57A includes three first links 571A and three second links 572A. The power generated by power source 56A is transmitted to support member 540A via the plurality of first links 571A and the plurality of second links 572A. As a result, support member 540A moves in the up-down direction or rotates with respect to ball joint 55A.

The plurality of first links 571A corresponds to the plurality of second motors 560A on a one-to-one basis. The plurality of second links 572A corresponds to the plurality of first links 571A on a one-to-one basis. The plurality of first links 571A is arranged at equal intervals in the rotation direction of rotor 23A about axis 239A of rotor 23A when viewed in the up-down direction. The plurality of second links 572A is arranged at equal intervals in the rotation direction of rotor 23A about axis 239A of rotor 23A when viewed in the up-down direction. Each second link 572A penetrates base plate 40A in the up-down direction, and is partially located inside of stator 22A.

One end of each first link 571A is coupled to output shaft 561A of corresponding second motor 560A. An end of each first link 571A opposite to corresponding output shaft 561A is rotatably coupled to one end of corresponding second link 572A. An end of each second link 572A opposite to corresponding first link 571A is rotatably coupled to support member 540A. Although only a part of transmission mechanism 57A is located inside of stator 22A, transmission mechanism as a whole may be located inside of stator 22A.

Support member 540A has as many coupling points 546A as second link 572A. That is, support member 540A includes three coupling points 546A. Three coupling points 546A are arranged at equal intervals in the rotation direction of rotor 23A about axis 239A of rotor 23A when viewed in the up-down direction.

The plurality of coupling points 546A corresponds to the plurality of second links 572A on a one-to-one basis. An end of each second link 572A opposite to corresponding first link 571A is coupled to corresponding coupling point 546A.

A rotational motion of output shaft 561A of each second motor 560A is converted into movement in the up-down direction of corresponding coupling point 546A of support member 540A via first link 571A and second link 572A. Output shaft 561A of each second motor 560A can be rotationally driven in directions opposite to each other. When output shaft 561A of each second motor 560A rotates in one direction, corresponding coupling point 546A of support member 540A moves upward. When output shaft 561A of each second motor 560A rotates in a direction opposite to the one direction, corresponding coupling point 546A of support member 540A moves downward.

Support member 540A moves upward as each second motor 560A is driven and each coupling point 546A is moved upward. Support member 540A moves downward as each second motor 560A is driven and each coupling point 546A is moved downward. By moving support member 540A in the up-down direction in this manner, the collective pitch control is performed.

The direction and the degree of inclination of support surface 545A of support member 540A with respect to the up-down direction is changed by driving arbitrary second motor 560A among the plurality of second motors 560A and moving corresponding coupling point 546A in the up-down direction. By changing the direction and the degree of inclination of support surface 545A of support member 540A with respect to the up-down direction in this manner, the cyclic pitch control is performed.

Driver 27A is not limited to include three motors 560A as in the present exemplary embodiment, and may be, for example, a mechanism including two or four or more motors. The mechanism for driving support member 540A may be, for example, a mechanism including one motor such as a spherical motor.

Figure 14:
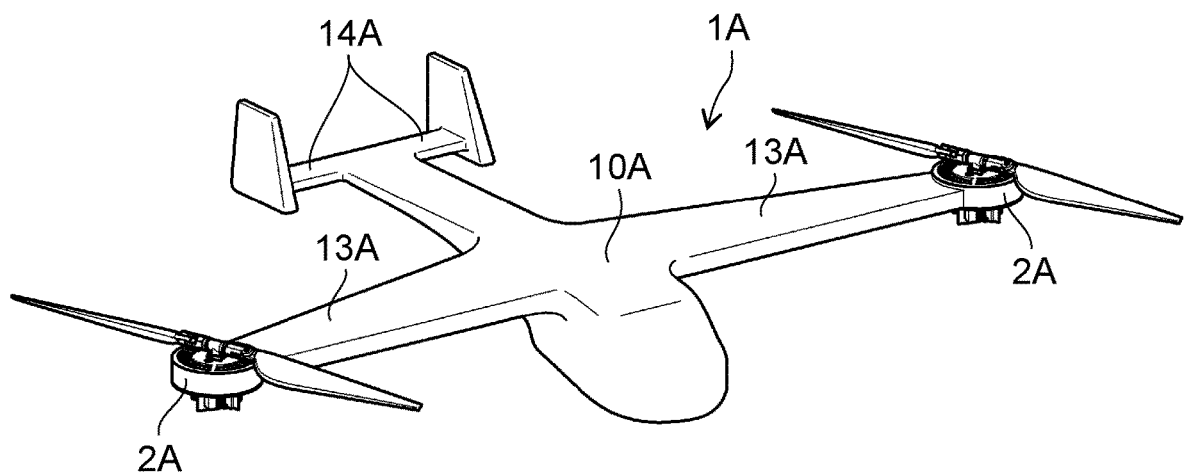
FIG. 14 is a perspective view of an aircraft including the motor unit.

FIG. 14 is a perspective view of aircraft 1A including motor unit 2A according to the second exemplary embodiment. Aircraft 1A includes two motor units 2A. Body 10A of aircraft 1A includes a plurality of wings 13A and a plurality of tails 14A. Body 10A includes two wings 13A as the plurality of wings 13A. Motor unit 2A is attached to each wing 13A.

Figure 15:
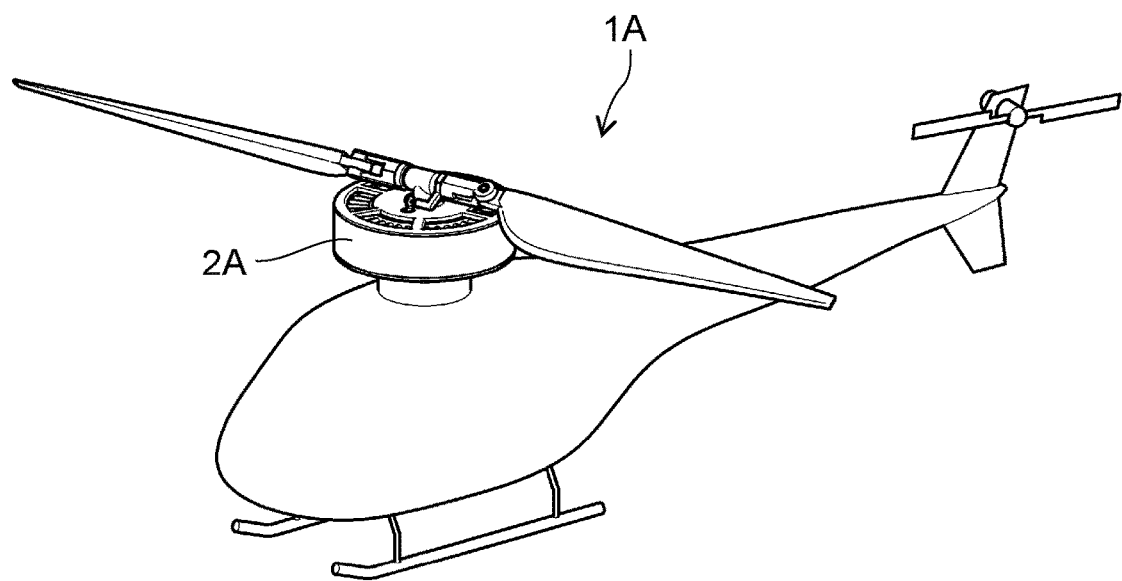
FIG. 15 is a perspective view of an aircraft of another example including the motor unit.

A number of motor units 2A included in aircraft 1A is not limited to two, and may be three or more. FIG. 15 is a perspective view of aircraft 1A of another example including motor unit 2A according to the second exemplary embodiment. For example, aircraft 1A may be a single rotor including only one motor unit 2A as illustrated in FIG. 15. Further, aircraft 1A may be a tilt rotor including a mechanism capable of changing the direction (inclination) of blade 3A with respect to body 10A.

Motor units 2, 2A and aircrafts 1, 1A according to the first and second exemplary embodiments can be modified in design as appropriate. For example, a shape, size, material, and the like of each element of motor unit 2 and aircraft 1 can be appropriately changed.

(3) Aspects

As is apparent from the exemplary embodiments described above, motor unit (2, 2A) according to a first aspect has the following configuration. Motor unit (2, 2A) includes motor (21, 21A) and pitch angle changing mechanism (5, 5A). Motor (21, 21A) generates power for rotating blade (3, 3A). Pitch angle changing mechanism (5, 5A) changes a pitch angle of blade (3, 3A). Motor (21, 21A) includes stator (22, 22A) and rotor (23, 23A). Rotor (23, 23A) is located outside of stator (22, 22A), and blade (3, 3A) is coupled to rotor (23, 23A). Pitch angle changing mechanism (5, 5A) includes one displaceable displacement member (moving member 50, coupling member 51, lever 533, interlocking member 534, swash plate 54A, ball joint 55A). A part of the displacement member is located inside of stator (22).

According to this feature, a part of the displacement member is disposed in a space formed inside of stator (22, 22A) included in motor (21, 21A) of outer rotor type. It is therefore possible to suppress an increase in size in a direction in which axis (239, 239A) of motor unit (2, 2A) extends. Further, since blade (3, 3A) can be disposed near stator (22, 22A) and rotor (23, 23A) in the direction in which axis (239, 239A) of rotor (23, 23A) extends, vibration of a member such as shaft (24, 24A) that supports rotor (23, 23A) can be suppressed.

In addition, by using motor unit (2, 2A) according to the present aspect, vibration of shaft (24, 24A) and the like can be particularly suppressed, and thus weight reduction can be achieved by thinning members such as shaft (24, 24A) and the like. The weight reduction of members such as shaft (24, 24A) allows a weight of aircraft (1, 1A) as a whole to be reduced when motor unit (2, 2A) according to the present aspect is mounted on aircraft (1, 1A) to be described later. Therefore, when the weight of aircraft (1, 1A) as a whole can be reduced, it is possible to extend time and distance per unit in which aircraft (1, 1A) flies.

Further, when members such as shaft (24, 24A) can be thinned, speed of reaction to various operations such as changing the pitch angle is increased. Therefore, when motor unit (2, 2A) according to the present aspect is mounted on aircraft (1, 1A) described later, responsiveness of aircraft (1, 1A) as a whole can be improved.

Motor unit (2A) according to a second aspect can be achieved by a combination with the first aspect. Motor unit (2A) according to the second aspect has the following configuration. Pitch angle changing mechanism (5A) performs cyclic pitch control. According to this aspect, it is possible to suppress an increase in size of motor unit (2A) including pitch angle changing mechanism (5A) that performs the cyclic pitch control in a direction of axis (239A) of motor unit (2A).

Motor unit (2A) according to a third aspect can be achieved by a combination with the second aspect. Motor unit (2A) according to the third aspect has the following configuration. Pitch angle changing mechanism (5A) includes rotating member (541A) and support member (540A). Rotating member (541A) is coupled to blade (3A), and rotates about axis (239A) serving a rotation center of rotor (23A) together with blade (3A). Support member (540A) has support surface (545A), and supports rotating member (541A) by support surface (545A). At least one of rotating member (541A) or support member (540A) is a displacement member.

According to this aspect, a part of rotating member (541A) or a part of support member (540A) is located inside of stator (22A), and it is therefore possible to further suppress an increase in size of motor unit (2A) in the direction of axis (239A).

Motor unit (2A) according to a fourth aspect can be achieved by a combination with the third aspect. Motor unit (2A) according to the fourth aspect has the following configuration. Pitch angle changing mechanism (5A) further includes ball joint (55A). Ball joint (55A) rotatably supports support member (540A). A part of ball joint (55A) is located inside of stator (22A).

According to this aspect, at least a part of ball joint (55A) is located inside of stator (22A), and it is therefore possible to further suppress an increase in size of motor unit (2A) in the direction of axis (239A).

Motor unit (2, 2A) according to a fifth aspect can be achieved by a combination with any one of the first to fourth aspects. Motor unit (2, 2A) according to the fifth aspect has the following configuration. Pitch angle changing mechanism (5, 5A) includes moving member (50, 51, 534, 55A, 540A, 541A) as a displacement member. Moving member (50, 51, 534, 55A, 540A, 541A) moves in a direction along axis (23, 23A) serving as the rotation center of rotor (239, 239A).

According to this aspect, at least a part of moving member (50, 51, 534, 55A, 540A, 541A) moving in the direction of axis (239, 239A) of rotor (23, 23A) is located inside of stator (22, 22A), and it is therefore possible to further suppress an increase in size of motor unit (2A) in the direction of axis (239A).

Motor unit (2, 2A) according to a sixth aspect can be achieved in combination with the fifth aspect. Motor unit (2, 2A) according to the sixth aspect has the following configuration. Motor unit (2, 2A) further includes shaft (24, 24A). Shaft (24, 24A) is located inside of stator (22, 22A) and defines the rotation center of rotor (23, 23A). A part of moving member (50, 51, 534, 55A, 540A, 541A) is located between stator (22, 22A) and shaft (24, 24A).

According to this aspect, shaft (24, 24A) defining rotation of motor (21, 21A) is disposed inside of stator (22, 22A), and it is therefore possible to further suppress an increase in size of motor unit (2, 2A) in the direction of axis (239, 239A).

Motor unit (2) according to a seventh aspect can be achieved in combination with the sixth aspect. Motor unit (2) according to the seventh aspect has the following configuration. Motor (21) further includes bearing (25). Bearing (25) rotatably supports shaft (24). A part of bearing (25) is located inside of stator (22).

According to this aspect, at least a part of bearing (25) is disposed inside of stator (22), and it is therefore possible to further suppress an increase in size in the direction in which axis (239) of motor unit (2) extends.

Motor unit (2) according to an eighth aspect can be achieved in combination with any one of the fifth to seventh aspects. Motor unit (2) according to the eighth aspect has the following configuration. Moving member (50) rotates about axis (239) together with rotor (23). Pitch angle changing mechanism (5) further includes lever (533) that moves moving member (50) in the direction of axis (239).

According to this aspect, moving member (50) that rotates together with rotor (23) can be moved by lever (533) in the direction in which axis (239) extends.

Motor unit (2) according to a ninth aspect can be achieved in combination with the eighth aspect. Lever (533) according to the ninth aspect is a displacement member.

According to this aspect, at least a part of lever (533) is disposed inside of stator (22), and it is therefore possible to further suppress an increase in size in the direction in which axis (239) serving as the rotation center of motor unit (2) extends.

Motor unit (2, 2A) according to a tenth aspect can be achieved by a combination with any one of the fifth to ninth aspects. Motor unit (2, 2A) according to the tenth aspect has the following configuration. Rotor (23, 23A) has opposing portion (230). Opposing portion (230) faces stator (22, 22A) in the direction of axis (239, 239A). Pitch angle changing mechanism (5, 5A) further includes at least one coupling member (51, 51A). Coupling member (51, 51A) connects moving member (50, 541A) and blade (3, 3A). Coupling member (51, 51A) penetrates opposing portion (230).

According to this aspect, moving member (50, 541A) and blade (3, 3A) are coupled by coupling member (51, 51A), and thus the pitch angle of blade (3, 3A) changes with the movement of moving member (50, 541A).

Motor unit (2, 2A) according to an eleventh aspect can be achieved in combination with the tenth aspect. Pitch angle changing mechanism (5, 5A) according to the eleventh aspect includes a plurality of coupling members (51, 51A) as one coupling member (51, 51A).

According to this aspect, moving member (50, 50A) and blade (3, 3A) are coupled by the plurality of coupling members (51, 51A), and thus the pitch angle of blade (3, 3A) is changed with the movement of moving member (50, 50A).

Motor unit (2) according to a twelfth aspect can be achieved in combination with any one of the fifth to eleventh aspects. Motor unit (2) according to the twelfth aspect has the following configuration. Rotor (23) includes guide (238). Guide (238) guides the movement of moving member (50) in direction of axis (239).

According to this aspect, a moving direction of moving member (50) is restricted by guide (238) of rotor (23).

Motor unit (2, 2A) according to a thirteenth aspect can be achieved by a combination with any one of the fifth to twelfth aspects. Motor unit (2) according to the thirteenth aspect has the following configuration. Pitch angle changing mechanism (5, 5A) further includes power source (second motor 52, 56A) for moving member (50, 540A, 541A, 55A). A part of power source (second motor 52, 56A) is located inside of stator (22, 22A).

According to this aspect, at least a part of power source (second motor 52, 56A) is located inside of stator (22, 22A), and it is therefore possible to further suppress an increase in size of motor unit (2, 2A) in the direction of axis (239, 239A).

Motor unit (2, 2A) according to a fourteenth aspect can be achieved in combination with any one of the first to thirteenth aspects. Motor unit (2, 2A) according to the fourteenth aspect further includes blade (3, 3A).

Aircraft (1, 1A) according to a fifteenth aspect has the following configuration. Aircraft (1, 1A) includes motor unit (2, 2A) according to the fourteenth aspect and body (10, 10A). Motor unit (2, 2A) is attached to body (10, 10A).

According to this aspect, it is possible to suppress an increase in size in the direction of axis (239, 239A) of motor unit (2, 2A) included in aircraft (1, 1A). Further, it is possible to suppress vibration of aircraft (1, 1A) during flight.

The motor unit and the aircraft of the present disclosure can be used in various fields such as household toys in addition to industries such as agriculture, transportation, and services.

The invention claimed is:

1. A motor unit comprising:
a motor that generates power for rotating a blade; and
a pitch angle changing mechanism that changes a pitch angle of the blade, wherein:
the motor includes a stator and a rotor that is located outside of the stator and to which the blade is coupled,
the pitch angle changing mechanism includes one displacement member that is displaceable,
the displacement member is partially located inside of the stator,
the pitch angle changing mechanism performs cyclic pitch control,
the pitch angle changing mechanism includes a rotating member that is coupled to the blade and rotates together with the blade about an axis serving as a rotation center of the rotor, and a support member that has a support surface and supports the rotating member by the support surface,
at least one of the rotation member or the support member is the displacement member, and
the pitch angle changing mechanism further includes a ball joint that rotatably supports the support member, and the ball joint is partially located inside of the stator.

2. The motor unit according to claim 1, further comprising the blade.

3. An aircraft comprising:
the motor unit described in claim 2; and
a body to which the motor unit is attached.

4. A motor unit comprising:
a motor that generates power for rotating a blade; and
a pitch angle changing mechanism that changes a pitch angle of the blade, wherein:
the motor includes a stator and a rotor that is located outside of the stator and to which the blade is coupled,
the pitch angle changing mechanism includes one displacement member that is displaceable, the displacement member is partially located inside of the stator, and the pitch angle changing mechanism includes, as the displacement member, a moving member that moves in a direction along the axis serving the rotation center of the rotor.

5. The motor unit according to claim 4, wherein the rotor includes a guide that guides movement of the moving member in the direction of the axis.

6. The motor unit according to claim 4, wherein the pitch angle changing mechanism further includes a power source for the moving member, and the power source is partially located inside of the stator.

7. The motor unit according to claim 4, further comprising a shaft located inside of the stator and defining the rotation center of the rotor, wherein the moving member is partially located between the stator and the shaft.

8. The motor unit according to claim 7, wherein the motor further includes a bearing that rotatably supports the shaft, and the bearing is partially located inside of the stator.

9. The motor unit according to claim 4, wherein the moving member rotates about the axis together with the rotor, and the pitch angle changing mechanism further includes a lever that moves the moving member in a direction of the axis.

10. The motor unit according to claim 9, wherein the lever is the displacement member.

11. The motor unit according to claim 4, wherein the rotor includes an opposing portion facing the stator in the direction of the axis, the pitch angle changing mechanism further includes at least one coupling member that couples the moving member and the blade, and the coupling member penetrates the opposing portion.

12. The motor unit according to claim 11, wherein the pitch angle changing mechanism includes a plurality of coupling members as the at least one coupling member.

13. The motor unit according to claim 4, further comprising the blade.

14. An aircraft comprising:

the motor unit described in claim 13; and a body to which the motor unit is attached.

* * * * *